(No Model.)
H. L. STANTON.
STEERING MECHANISM FOR BICYCLES.
No. 593,696. Patented Nov. 16, 1897.
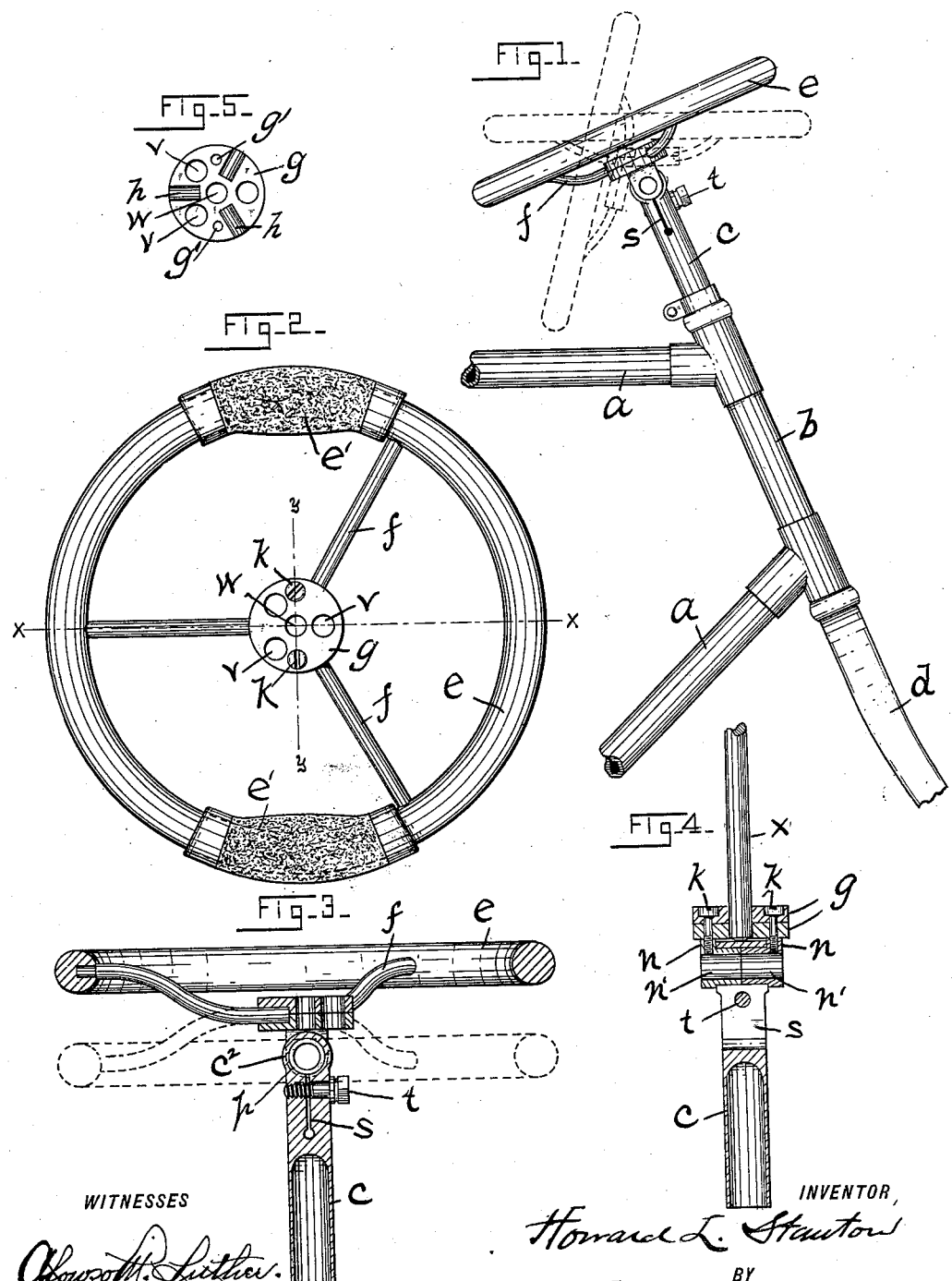

United States Patent Office.

HOWARD L. STANTON, OF NORWICH, CONNECTICUT, ASSIGNOR OF ONE-HALF TO LESTER & WASLEY, OF SAME PLACE.

STEERING MECHANISM FOR BICYCLES.

SPECIFICATION forming part of Letters Patent No. 593,696, dated November 16, 1897.

Application filed February 18, 1897. Serial No. 624,067. (No model.)

*To all whom it may concern:*

Be it known that I, HOWARD L. STANTON, a citizen of the United States, and a resident of Norwich, in the county of New London and State of Connecticut, have invented certain new and useful Improvements in Steering Mechanism for Bicycles, which improvements are fully set forth and described in the following specification, reference being had to the accompanying sheet of drawings.

The immediate purpose of this invention is to produce improved means for controlling and adjusting the steering mechanism of bicycles and the like vehicles. Heretofore it has been a common practice to secure to the frame in which the front wheel is journaled so-called "handle-bars," consisting of oppositely-extending rods or tubes that terminate in handles of cork or other suitable material. Such handle-bars are usually of considerable length and frequently interfere more or less with mounting and dismounting and in some instances said handle-bars have been the direct cause of serious accidents.

My present invention seeks to overcome the objectionable features of such handle-bars and also provides a controlling device for the steering-post that may be more conveniently grasped than the laterally-extending bars now so commonly used.

To assist in explaining my newly-invented steering device, the accompanying sheet of drawings has been provided, which serve to illustrate the same as follows:

Figure 1 shows in elevation the front portion or steering-head of a bicycle fitted up with my newly-invented improvement. Fig. 2 is an enlarged plan view of my said device. Figs. 3 and 4 are sectional views taken, respectively, on lines $xx$ and $yy$ of Fig. 2. Fig. 5 shows detached a certain element employed in the construction of my device.

Referring to the drawings, the letter $a$ denotes a portion of a bicycle-frame, and $b$ the steering-head.

The letter $c$ denotes the steering-post telescoped in the usual manner in the steering-head $b$, and $d$ denotes a portion of the front fork of the bicycle, within which is journaled the front or steering wheel. The upper end of post $c$ has secured thereto means for controlling said post and effecting the steering of the bicycle. The result heretofore attained by means of the well-known handle-bars I reach by means of my newly-invented device, which consists of a hand-wheel which, like the said handle-bars, is secured to the upper end of post $c$.

To accomplish the desirable ends mentioned in the foregoing statement of the object of my invention I have provided what I term a "steering-wheel," the rim of which is denoted by reference-letter $e$ and is constructed of tubing, wood, or other suitable material.

Rim $e$ is preferably circular, as shown, and is supported by a number of spokes $f$, radiating from a central hub and engaging said rim preferably at equidistant points. The outer ends of spokes $f$ are secured to the rim $e$, as shown in Fig. 3, or in any other suitable manner. The hub which receives the inner ends of the spokes is formed of two disks $g$, each of which has provided in one face grooves $h$, corresponding in number and location to the spokes $f$. Disks $g$ are assembled with their grooved faces confronting and with the opposing grooves coincident. The grooves $h$ are of such shape that when disks $g$ are assembled in the manner just mentioned the said confronting grooves form circular recesses to receive the inner ends of the spokes $f$, in which recesses they are securely held by the clamping together of the disks. Disks $g$ are clamped together by means of two screws $k$, the disks being provided with diametrically opposed holes, and each of said screws enters and is screwed into a lug $n$, thus serving to clamp together said disks and lugs, as will be readily understood from Fig. 4. Each lug $n$ has formed thereon a projecting tubular portion $n'$, which portions are brought coincident with each other when the various elements of my device thus far described are properly assembled, thus forming a two-part tube rigidly secured to the disks $g$, as shown in Fig. 4 of the drawings.

The two-part tube composed of the sections $n$ corresponds to the support for the central portion of a pair of ordinary adjustable handle-bars, and in my device said sections may be secured to the steering-post in any of the various ways commonly employed, but I preferably employ the following-described clamping means: I have provided a steering-post $c$, having a solid upper portion $c'$, which is bored horizontally, as at $p$, to receive the sections $n'$ of the two-part tube. The said solid portion of the post $c$ is split downward from opening $p$, as at $s$, in a manner well understood, and passing through said split portions is a set-screw $t$, which serves to draw together the split sections of post $c$, also to clamp the two-part tube within the circular strap $c^2$, connecting said split sections and forming the upper inclosing wall of opening $p$.

In assembling my newly-invented device the sections $n'$ of the two-part tube are first introduced (from opposite ends) into the opening $p$. One of the disks $g$ is next placed in position on the lugs $n$, and the ends of the spokes $f$ are laid in the grooves thereof, after which the companion disk is placed in position, and the whole is then securely clamped together by means of the screws $k$.

A very great range of adjustment is provided for my newly-invented device in the following manner: The spokes $f$ are so bent or offset that the rim $e$ is supported in a different plane from the wheel-hub, as shown in Figs. 1 and 3, and it will be readily understood by reference to the last-mentioned figure that by reversing said rim and spokes the elevation of the rim will be materially changed. (See dotted lines.) It will also be seen that the device is pivotally secured to the upper end of the steering-post $c$, so that the same may be clamped at any desired angle, two positions thereof being shown in dotted lines in Fig. 1.

When about to use my device, it is first adjusted to the desired position in the manner already described, and when riding the rim $e$ is grasped at the points at which it may be most convenient for the rider, it being understood that through the partial rotation of the hand-wheel the steering of the bicycle is effected.

The rim $e$ may be provided at the most convenient points with the usual handles $e'$, of cork or similar material, as in Fig. 2, but this last feature is not essential.

The disks $g$ are shown as provided with holes $v$ therein to lighten them and also with a central hole $w$, in which may be inserted a stick or rod $x$, adapted to bear a flag, or colors, or other decorations.

My device as a whole provides steering apparatus much stiffer than the ordinary handle-bars, and therefore does away with the vibration now so objectionable and also avoids entirely the liability of interference with the rider in mounting, dismounting, or in turning curves, which objectionable features exist in the steering apparatus now in use, while at the same time all adjustments capable of being made with such old apparatus are possible in my described improved steering mechanism.

My device may be very cheaply produced, is of neat appearance, and performs in a very satisfactory manner the work for which it was designed.

Having thus described my invention, I claim—

1. The combination with the steering-post of a bicycle, a stem, the upper end of which is provided with a transverse perforation, a lug adjustably secured in each end of the perforation, a steering-wheel provided with a two-part hub, and means for securing said parts of the hubs together and for securing them to the lugs, substantially as set forth.

2. In combination with a steering-post of a bicycle, a stem therein the upper end of which is perforated transversely, lugs adjustably secured in the stem, a two-part centrally-perforated hub secured to the lugs, the adjacent faces of the parts of the hubs being provided with radial grooves, spokes secured in the grooves and means for securing the parts of the hubs together and to the lugs, substantially as set forth.

HOWARD L. STANTON.

Witnesses:
FRANK H. ALLEN,
MAY F. RITCHIE.